United States Patent [19]

Dosio

[11] 4,155,274
[45] May 22, 1979

[54] SELF-LOCKING GEARLESS DIFFERENTIAL FOR MOTOR VEHICLES

[76] Inventor: Marcello Dosio, Via Gamalero 31, Turin, Italy

[21] Appl. No.: 875,830

[22] Filed: Feb. 7, 1978

[30] Foreign Application Priority Data

Feb. 11, 1977 [IT] Italy ............................. 67319 A/77

[51] Int. Cl.² ........................................... F16H 35/04
[52] U.S. Cl. ................................................... 74/650
[58] Field of Search ........................................... 74/650

[56] References Cited

U.S. PATENT DOCUMENTS

| | | | |
|---|---|---|---|
| 1,328,217 | 1/1920 | Watkins | 74/650 |
| 1,843,163 | 2/1932 | Jex | 74/650 |
| 1,939,756 | 12/1933 | Arnold | 74/650 |
| 2,329,075 | 9/1943 | Myers | 74/650 |
| 2,790,334 | 4/1957 | Wildhaber | 74/650 |
| 2,873,619 | 2/1959 | Wildhaber | 74/650 |

Primary Examiner—Lance W. Chandler
Attorney, Agent, or Firm—Sughrue, Rothwell, Mion, Zinn and Macpeak

[57] ABSTRACT

A self-locking or limited slip differential gear for motor vehicles comprises a housing from opposite sides of which project two coaxial output shafts for connection to respective half shafts of the vehicle; linking the housing and the output shafts is a mechanism comprising a central body rotatable with respect to the housing and engaged on either side with a respective connection body which is not rotatable with respect to the housing but is slidable with respect thereto along a line perpendicular to the axis of rotation of the central body; engaged in these connection bodies are blocks carried on eccentric pins fixed to the output shafts and the axes of which are parallel to the common axis of the output shafts.

3 Claims, 6 Drawing Figures

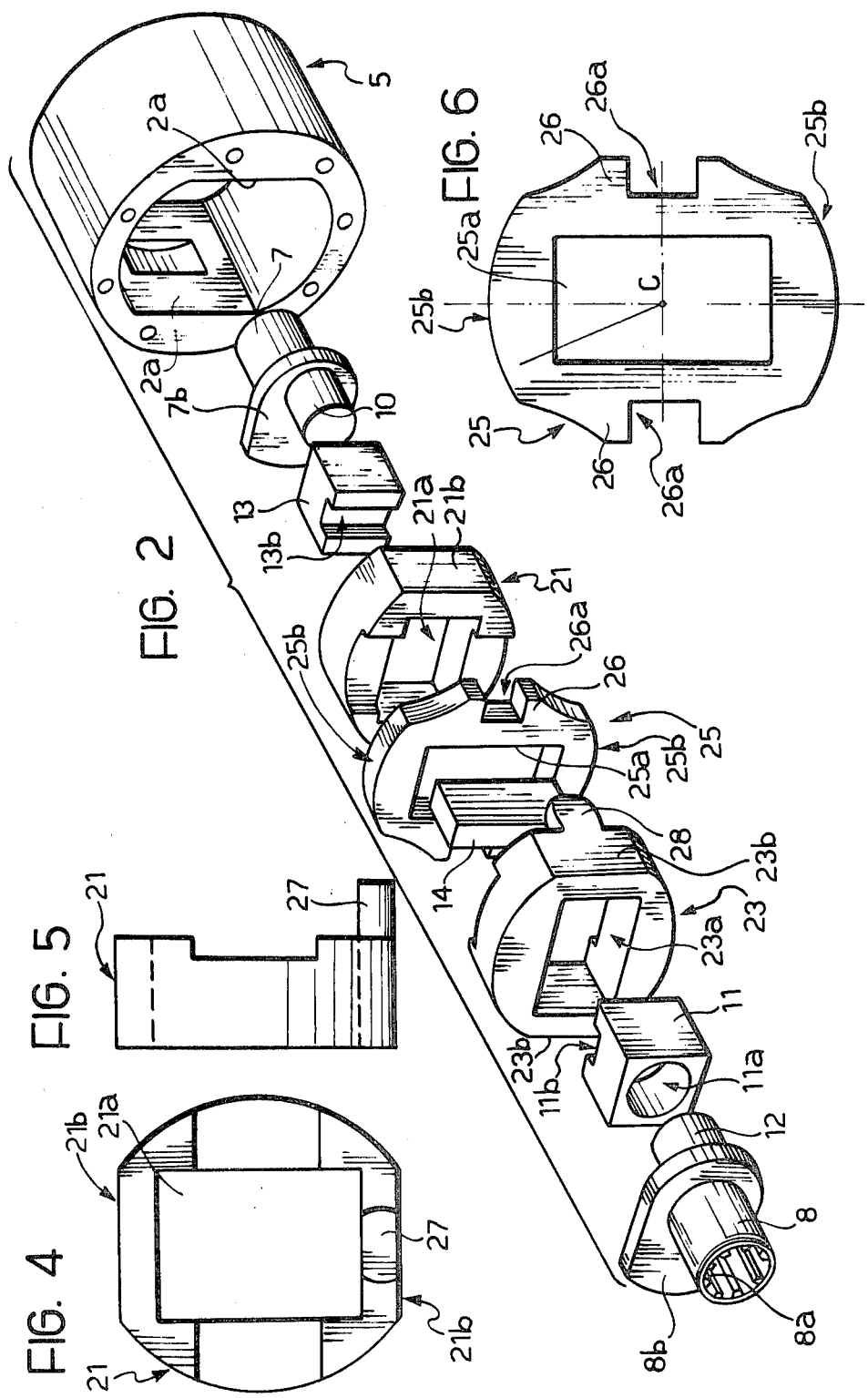

SELF-LOCKING GEARLESS DIFFERENTIAL FOR MOTOR VEHICLES

BACKGROUND OF THE INVENTION

The present invention relates to a self-locking differential gear for motor vehicles; such differentials are sometimes referred to as limited-slip differentials. Known such differential gears include a housing which is rotatable with respect to the chassis or body of the motor vehicle and which is driven via a transmission shaft from the engine of the vehicle. The housing has two output shafts which are coaxially aligned with one another, their respective inner ends, within the housing, facing one another but being spaced a certain distance apart: these output shafts are connected directly to the corresponding half shafts which transmit drive to the driving wheels of the motor vehicle. Between the housing and the two output shafts is a kinematic connection means which usually includes a pair of coaxial conical gear wheels respectively connected to the two output shafts of the differential gear, and at least two intermediate conical gear wheels serving as satelite gears between the two main conical gears mentioned above; these conical satelite gears are supported by pins rigidly on the closed housing of the differential gear.

The self-locking feature of prior art differential gears is obtained by means of auxiliary elements rigidly connected to the two output shafts and provided with friction surfaces which become pressed against corresponding friction surfaces formed on the housing or on elements carried by the housing, by the action of resilient means. In this way, relative sliding movement which takes place between the frictional surfaces mentioned above in certain operating conditions, that is when the output shafts rotate with respect to the housing, causes a resistive couple to be formed which permits the transmission of a certain twisting moment to one of the two half shafts even in a case in which the other of the two half shafts is rotating freely due to skidding or slipping of the associated road wheel of the motor vehicle. This type of differential gear is, however, of a notably complex construction and is therefore also rather costly, requiring for its construction the use of elements such as gears and springs which necessitate, for their manufacture, the use of rather sophisticated technology.

OBJECTS OF THE INVENTION

The primary object of the present invention is to provide a self-locking differential gear for motor vehicles which does not rely for its operation on friction surfaces or springs.

Another object of the present invention is a self locking differential gear which is of very simple construction.

A further object of the invention is a self-locking differential gear which is particularly economical to manufacture.

Yet another object of the invention is a self-locking differential gear of particularly certain operation due to the fact that it does not rely on friction surfaces for its operation.

SUMMARY OF THE INVENTION

According to the present invention, in a self-locking differential gear for a motor vehicle, of a type comprising: a closed housing mounted rotatably with respect to the body of the motor vehicle to be driven by the engine of the vehicle, two coaxial output shafts mounted in the housing having means for connecting to respective half shafts which drive the driving wheels of the vehicle, the inner ends of the output shafts extending inside the housing being spaced from one another, and connection means between said housing and said two output shafts; there is provided the improvement wherein said connection means between said housing and said two output shafts includes: a first pin the axis of which lies parallel to the common axis of said two output shafts, means mounting said first pin rigidly and eccentrically with respect to the inner end of one of said two output shafts, a second pin the axis of which lies parallel to the common axis of said two output shafts, means mounting said second pin rigidly and eccentrically with respect to the inner end of the other of said two output shafts, first and second blocks rotatably mounted on said first and second pins respectively, prismatic coupling means linking said first and second blocks for relative sliding movement along a given rectilinear sliding direction, first and second connection bodies interposed between said first and second blocks, means defining an opening in said first connection body having two parallel walls extending perpendicular to said given rectilinear sliding direction, said first block being slidably housed in said opening in engagement with said two parallel walls, means defining an opening in said second connection body having two parallel walls extending perpendicular to said given rectilinear sliding direction, said second block being slidably housed in said opening in engagement with said two parallel walls, means constraining said first and second connection bodies for displacement with respect to said housing along a rectilinear path which is parallel to said given rectilinear sliding direction, a central body interposed between said first and second connection bodies and rotatably supported in said housing for turning movement about an axis coincident with the common axis of said two output shafts, first and second engagement means on said central body located on opposite sides of said axis of rotation of said central body, third engagement means on said first connection body, said third engagement means cooperatively engaging said first engagement means on said central body, fourth engagement means on said second connection body, said fourth engagement means cooperatively engaging said second engagement means of said central body whereby relative turning movement of said central body with respect to said housing is accompanied by rectilinear movement with respect to said housing of said first and second connection bodies.

Various other features and advantages of the invention will become apparent during the course of the following description with reference to the accompanying drawings, which is provided purely by way of illustrative example.

BRIEF DESCRIPTION OF THE DRAWINGS

FIG. 2 is a partially exploded perspective view of the differential gear shown in FIG. 1;

FIGS. 4, 5 and 6 are detail views of components of the differential gear of FIG. 1.

DESCRIPTION OF THE PREFERRED EMBODIMENTS

Figure 1:
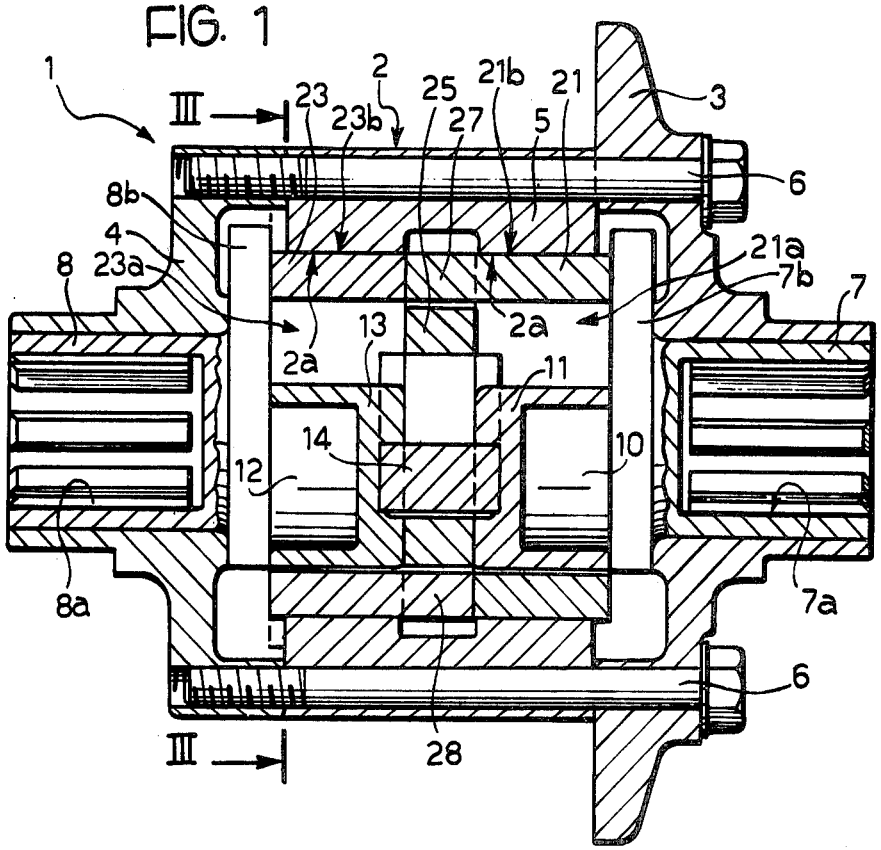
FIG. 1 is an axial section of a differential gear according to the invention.
Figure 3:
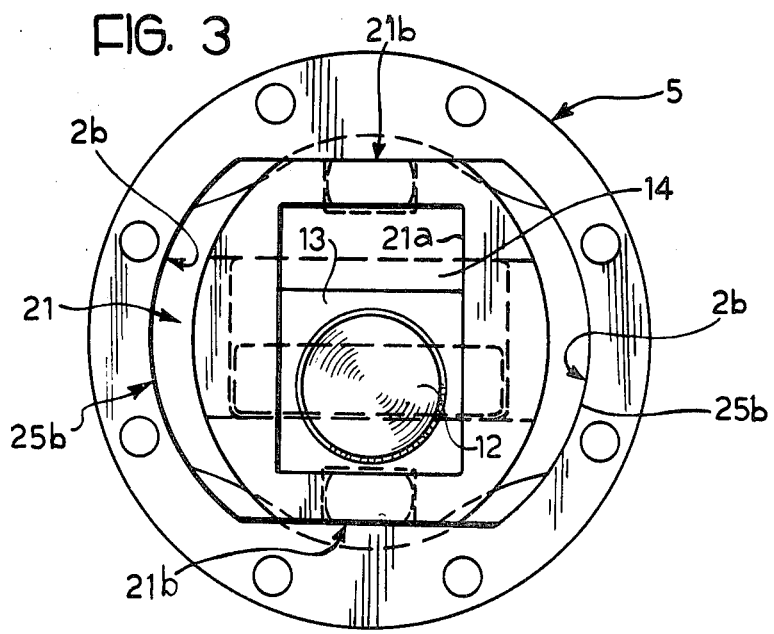
FIG. 3 is a section taken on the line III—III of FIG. 1.

Referring to the drawings there is shown a self-locking differential gear for motor vehicles which is generally indicated with the reference numeral 1. The differential gear 1 comprises a substantially closed housing 2 constituted by a hollow, substantially cylindrical, central element 5 the inner surface of which has two parallel diametrically opposed flats 2a. The central element 5 is closed at the ends by two flanges 3 and 4 which are clamped in place by means of a plurality of through screws 6. The housing 2 supports two output shafts 7 and 8 coaxially aligned with one another. Each shaft 7 and 8 has a concentric bore opening into the outer end thereof and the inner surface of this bore is formed as a splined surface, 7a and 8a respectively, intended to engage a corresponding inner end, also splined, of the respective half shaft (not illustrated) of the motor vehicle.

At the inner ends of the two output shafts 7 and 8 are respective plane flanges 7b and 8b which face one another and are spaced apart. The flange 7b of the output shaft 7 carries, in an eccentric position with respect to the common axis of the two shafts 7 and 8, a pin 10 on which is mounted rotatably a small approximately square block 11. Likewise, from the inner face of the flange 8b there projects a pin 12 which is also eccentric with respect to the above mentioned axis; the pin 12 also carries rotatably a small approximately square block 13. The blocks 11 and 13 each have, on their respective facing surfaces a groove 11b, 13b each of which extends parallel to two parallel sides of the block and perpendicular to the axis of the mounting pin 10, 12.

Slidably engaged in the two grooves 11b, 13b is a connecting key 14. In this way the block 11 can slide with respect to the block 13 along a rectilinear sliding direction parallel to the key 14. The blocks 11 and 13 are also coupled, by the engagement of two parallel sides thereof which are perpendicular to the said grooves 11b and 13b, to the side walls of respective slits 21a, 23a, formed in two connection bodies 21, 23 respectively. The two slits 21a and 23a extend perpendicularly with respect to the direction of the grooves 11b and 13b and therefore perpendicularly to the direction of relative sliding between the two blocks 11 and 13.

The two connection bodies 21 and 23 are lodged within the interior of the housing 2 and are guided in a slidable manner within the housing by engagement between the parallel flat walls 2a of the inner surface of the hollow central element 5, and a corresponding pair of parallel flat surfaces 21b, 23b formed on each of the two connection bodies 21 and 23: These latter surfaces are perpendicular to the slits 21a, 23a and therefore parallel to the grooves 11b and 13b and to the above mentioned sliding direction.

Between the two connection bodies 21 and 23 is interposed a central body 25 constituted by a moulded plate of generally annular form having a rectangular central opening 25a through which passes the key 14. The central body 25 has on two opposite edges, and in positions adjacent the longer walls of the rectangular opening 25a, two projections 26 each of which has an outwardly facing notch 26a. The notches 26a are aligned with a plane of symmetry of the body 25 which is perpendicular to the longer walls of the rectangular opening 25a. Perpendicular to this plane of symmetry two opposite edges of the body 25 are formed as respective curved surfaces 25b constituted by arcs of a circle having its centre C at the centre of symmetry of the notches 26a. The surfaces 25b contact correspondingly curved surfaces 2b of the interior of the housing 2 in positions coaxial with the output shafts 7 and 8 permitting the body 25 to turn, at least over a limited arc, about this axis with respect to the housing 2.

Into the notches 26a of the central body 25 engage respective projections 27, 28 in the form of teeth, one (27) formed on the connection body 21 and the other (28) formed on the connection body 23. The operation of the differential gear 1 is as follows.

In conditions of normal operation, that is to say when the vehicle is travelling in a straight line and both the driving wheels have an equal and firm grip on the ground, the housing 2, which is driven to rotate by the engine of the vehicle in a known way, causes the connection bodies 21 and 23 to rotate by virtue of the engagement of the flats 2a of the central element 5 with the flat walls 21b, 23b of the connection bodies 21, 23. The central body 25 engaged by the teeth 27, 28, and the output shafts 7 and 8 engaged by the blocks 11, 13 which are turned by their engagement with the rectangular slots 23a, 21a are also driven as if they all constituted a single rigid element with the housing 2.

If, for example, the housing 2 is fixed, and the shaft 7 is turned, then starting from the position illustrated in FIG. 2 in which the pins 10 and 12, and therefore also the blocks 11 and 13 are aligned, it will be observed that the displacement of the pin 10 causes the consequent displacement of the connection body 21 with respect to the housing 2. The projecting tooth 27 of the body 21, cooperating with the corresponding notch 26a in the central body 25, causes this latter to turn about its own centre C. This causes the displacement of the projection 28 of the connection body 23 in a direction opposite that of the projection 27 of the body 21. The connection body 23, therefore, is displaced rectilinearly in a direction opposite that of the body 21. This displacement of the connection body 23 causes a corresponding displacement of the pin 12, and therefore a corresponding rotation of the output shaft 8 in a direction opposite that of the output shaft 7.

It will be appreciated therefore, that the two shafts 7 and 8 rotate by the same amount but in opposite directions, as happens in usual differential gears of motor vehicles, except that this movement is limited by the rectilinear displacement of the connection bodies 21, 23. Therefore, when the vehicle is travelling in a curve, the two driving wheels, driven by their respective output shafts 7 and 8, can maintain continuous contact with the ground on which the vehicle is moving despite the fact that one rotates further than the other.

Moreover, as mentioned above, by the particular geometry of the elements which kinematically connect the housing 2 and the output shafts 7 and 8, the transmission of movement from one output shaft to the other if the housing is fixed becomes forcefully opposed after a certain limited displacement has taken place. Consequently the differential gear illustrated is a differential of the type which is usually termed "self-locking" or "limited slip" in as much as, even in the case in which one of the driving wheels slips on the ground, it is always possible to transmit a certain motive force from the housing 2 to the other output shaft.

Without changing the principle of the invention, the practical embodiments and in particular the details of construction, can be widely varied with respect to that which has been described and illustrated above, without by this departing from the spirit and scope of the present invention.

What is claimed is:

1. In a self-locking differential gear for a motor vehicle, of a type comprising:
    a closed housing mounted rotatably with respect to the body of the motor vehicle to be driven by the engine of the vehicle,
    two coaxial output shafts mounted in the housing having means for connecting to respective half shafts which drive the driving wheels of the vehicle, the inner ends of the output shafts extending inside the housing being spaced from one another, and
    connection means between said housing and said two output shafts;
    the improvement wherein said connection means between said housing and said two output shafts includes:
    a first pin the axis of which lies parallel to the common axis of said two output shafts,
    means mounting said first pin rigidly and eccentrically with respect to the inner end of one of said two output shafts,
    a second pin the axis of which lies parallel to the common axis of said two output shafts,
    means mounting said second pin rigidly and eccentrically with respect to the inner end of the other of said two output shafts,
    first and second blocks rotatably mounted on said first and second pins respectively,
    prismatic coupling means linking said first and second blocks for relative sliding movement along a given rectilinear sliding direction,
    first and second connection bodies interposed between said first and second blocks,
    means defining an opening in said first connection body having two parallel walls extending perpendicular to said given rectilinear sliding direction, said first block being slidably housed in said opening in engagement with said two parallel walls,
    means defining an opening in said second connection body having two parallel walls extending perpendicular to said given rectilinear sliding direction, said second block being slidably housed in said opening in engagement with said two parallel walls,
    means constraining said first and second connection bodies for displacement with respect to said housing along a rectilinear path which is parallel to said given rectilinear sliding direction,
    a central body interposed between said first and second connection bodies and rotatably supported in said housing for turning movement about an axis coincident with the common axis of said two output shafts,
    first and second engagement means on said central body located on opposite sides of said axis of rotation of said central body,
    third engagement means on said first connection body, said third engagement means cooperatively engaging said first engagement means on said central body,
    fourth engagement means on said second connection body, said fourth engagement means cooperatingly engaging said second engagement means of said central body whereby relative turning movement of said central body with respect to said housing is accompanied by rectilinear movement with respect to said housing of said first and second connection bodies.

2. The self-locking differential gear of claim 1, wherein said first and second engagement means of said central body are diametrically opposed across a diameter which is perpendicular to said given sliding direction between said first and second blocks when the axes of said first and second pins which carry said first and second blocks, and said common axis of said first and second output shafts all lie in the same plane.

3. The self-locking differential gear of claim 2, wherein said first and second engagement means of said central body are respective recesses in the form of notches facing radially outwardly, and said third and fourth engagement means of said first and second connection bodies respectively each comprise an axially extending tooth engaged in a respective said notch.

* * * * *